(12) United States Patent
Bogumil et al.

(10) Patent No.: US 8,012,648 B2
(45) Date of Patent: Sep. 6, 2011

(54) SIDE SPRING COMPRESSION RETENTION SYSTEM

(75) Inventors: Todd D. Bogumil, Rochester, NY (US); Eric J. Connor, Rochester, NY (US); Anthony G. Chinnici, Rochester, NY (US); Paul F. Spacher, Rochester, NY (US); Mark W. Keyser, Bloomfield, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 749 days.

(21) Appl. No.: 12/115,953

(22) Filed: May 6, 2008

(65) Prior Publication Data

US 2009/0280359 A1 Nov. 12, 2009

(51) Int. Cl.
*H01M 8/04* (2006.01)
*H01M 8/02* (2006.01)
(52) U.S. Cl. .................. 429/511; 429/508; 429/535
(58) Field of Classification Search .................... 429/511
See application file for complete search history.

(56) References Cited

U.S. PATENT DOCUMENTS

| | | | | |
|---|---|---|---|---|
| 4,430,390 A | * | 2/1984 | Fekete | 429/459 |
| 4,849,308 A | * | 7/1989 | Schmitten et al. | 429/460 |
| 4,973,531 A | * | 11/1990 | Zaima et al. | 429/470 |
| 5,484,666 A | | 1/1996 | Gibb et al. | |
| 2008/0102345 A1 | | 5/2008 | Andreas-Schott et al. | |

* cited by examiner

*Primary Examiner* — John S Maples
(74) *Attorney, Agent, or Firm* — Fraser Clemens Martin & Miller LLC; J. Douglas Miller

(57) ABSTRACT

A compression retention system for a fuel cell system is provided. The compression retention system includes a first end unit and a second end unit configured to hold a fuel cell stack therebetween. A spring configured to apply a compressive force to the fuel cell stack is disposed between a first spring plate and a second spring plate. The first spring plate has an aperture formed therein. The compression retention system further includes a pair of sheets coupled to the first spring plate and the first end unit, and a spring strut disposed through the aperture of the first spring plate and coupled to the second spring plate and to the second end unit. A fuel cell system and method for assembling the fuel cell system with the compression retention system are also provided.

17 Claims, 7 Drawing Sheets

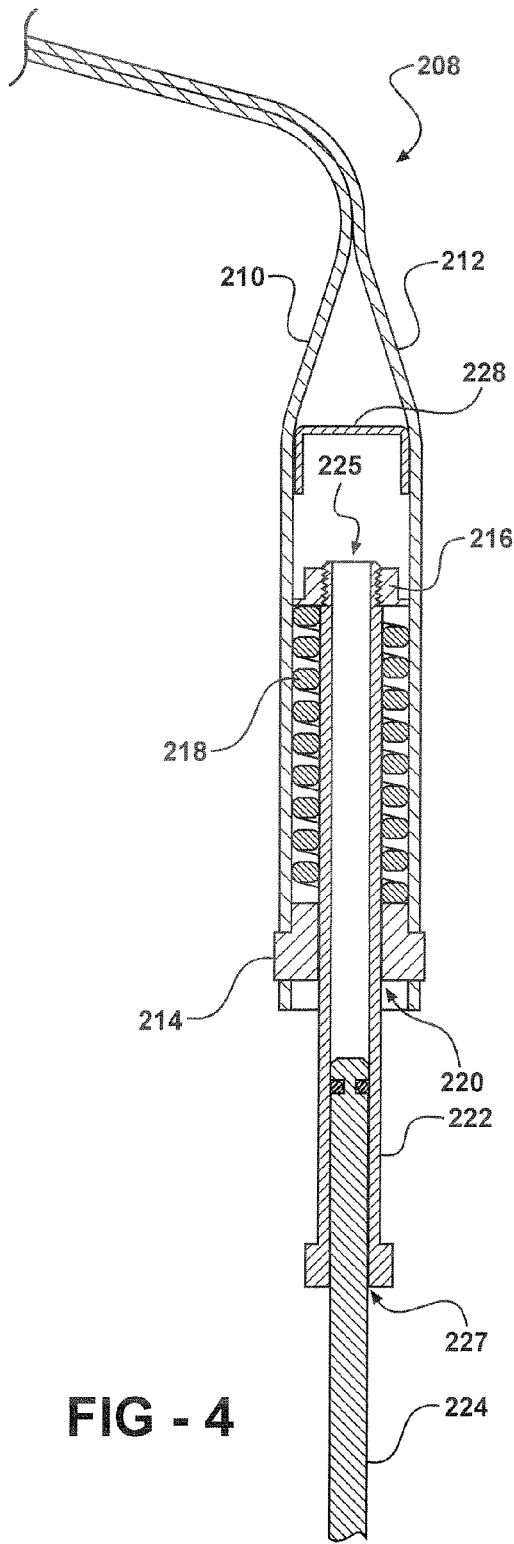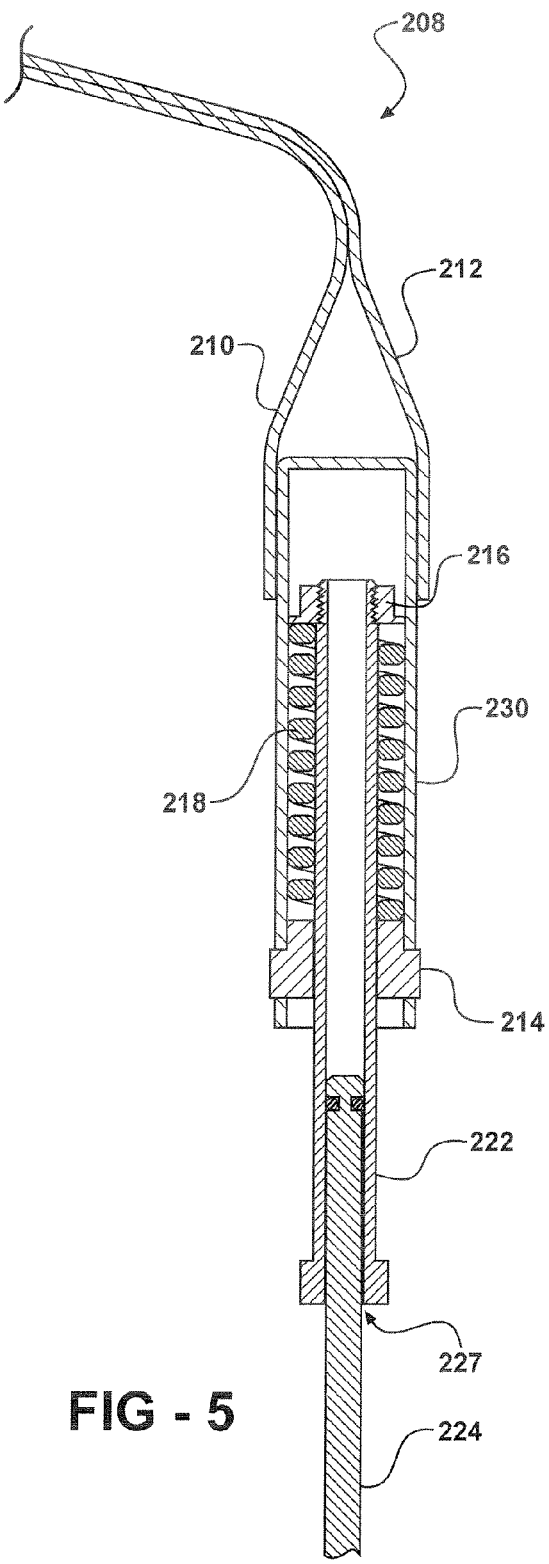

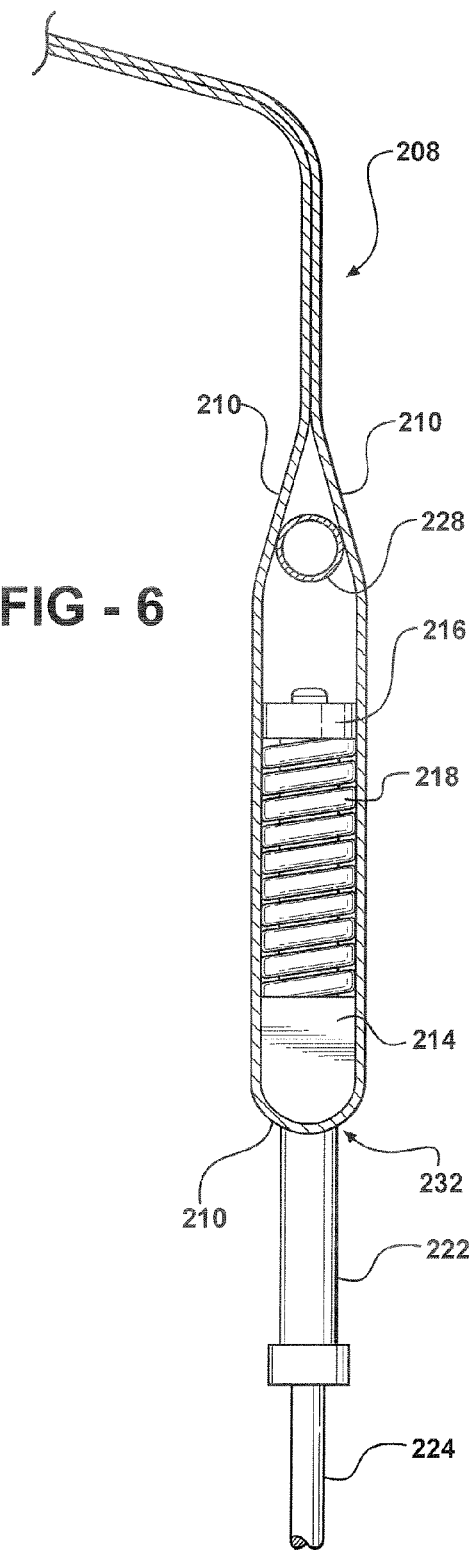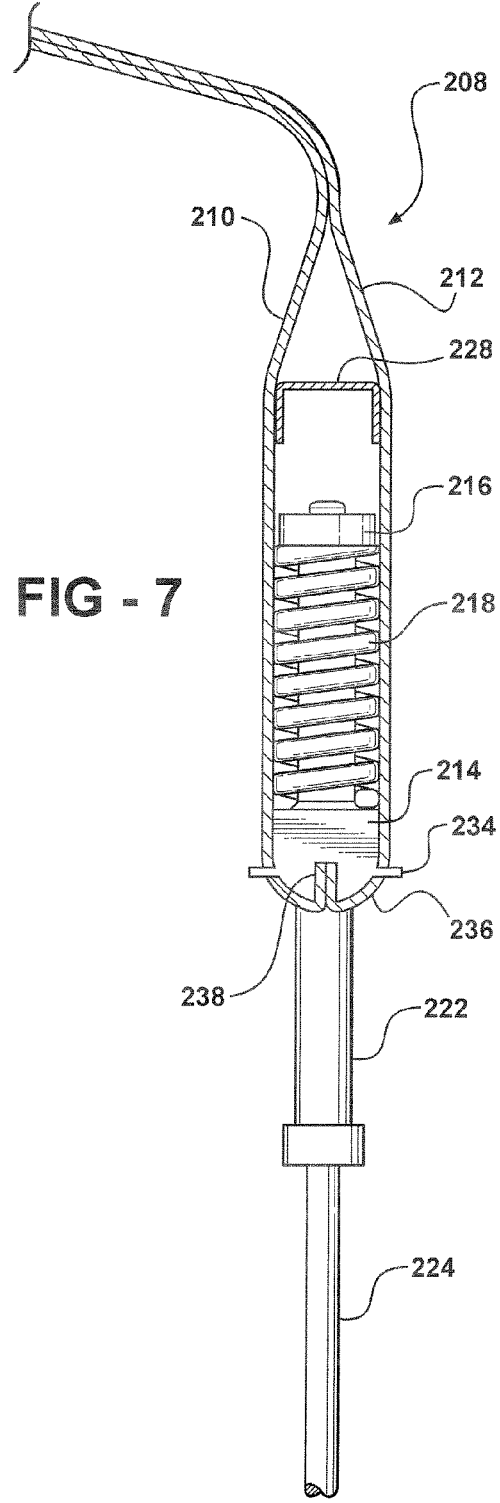

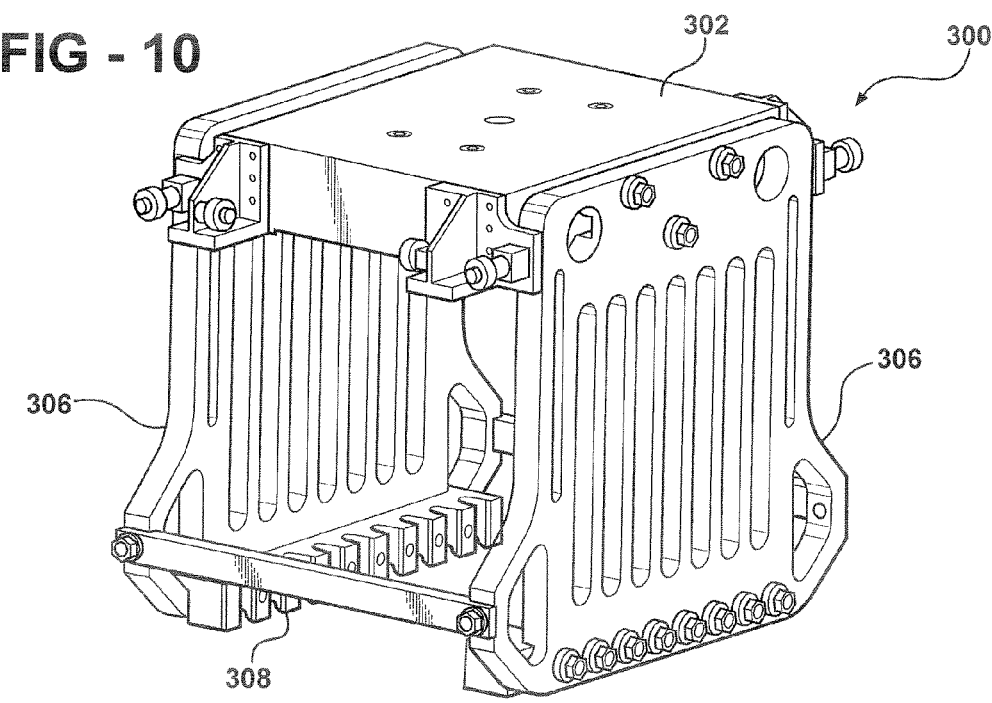
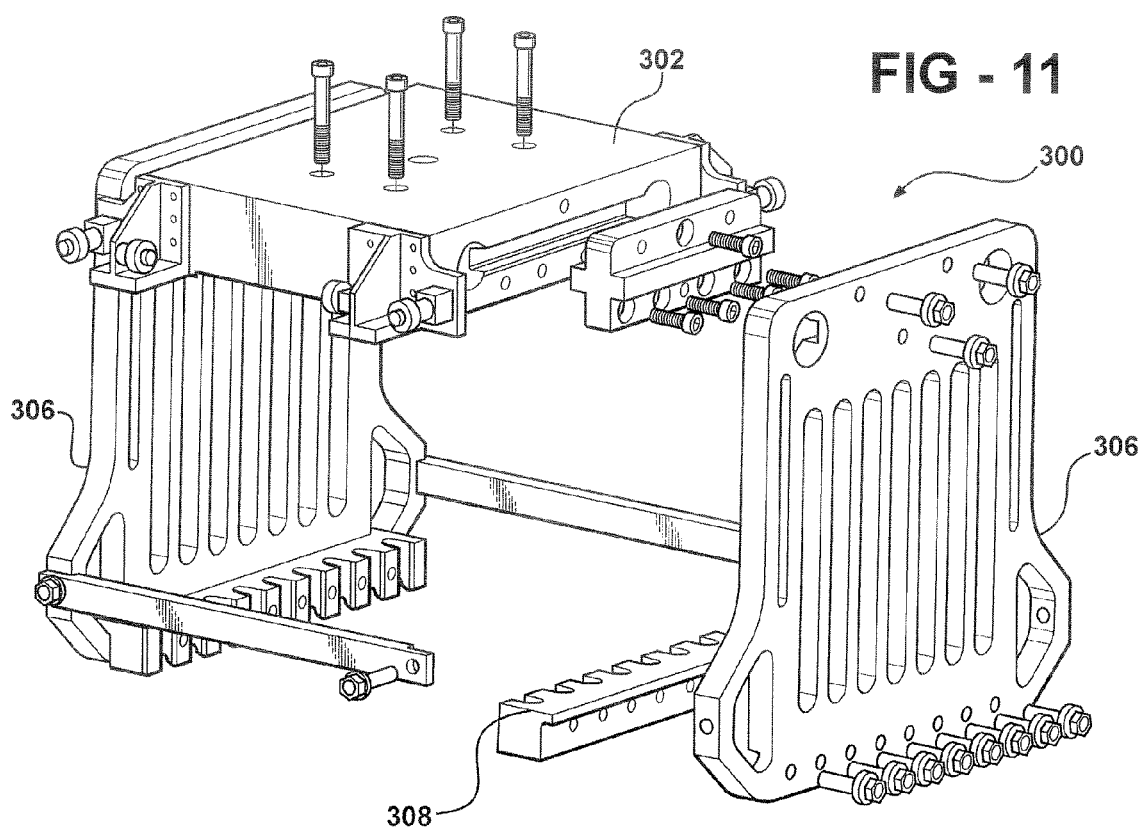

SIDE SPRING COMPRESSION RETENTION SYSTEM

FIELD OF THE INVENTION

The present disclosure relates generally to fuel cell systems, and more particularly to compression retention systems for fuel cell systems.

BACKGROUND OF THE INVENTION

Fuel cells have been proposed as a clean, efficient and environmentally responsible power source for electric vehicles and various other applications. One type of fuel cell is known as a proton exchange membrane (PEM) fuel cell. The PEM fuel cell is an electrochemical device that includes an anode and a cathode with an electrolyte membrane therebetween. The anode receives hydrogen gas and the cathode receives oxygen, normally distributed through porous materials called gas diffusion media. The hydrogen gas is catalytically disassociated in the anode to generate free protons and electrons. The protons pass through the electrolyte to the cathode. The protons react with the oxygen and the electrons in the cathode to generate water. The electrons from the anode cannot pass through the electrolyte, and thus, are directed through an electric load, such as a vehicle, to perform work before being sent to the cathode.

Individual fuel cells are generally connected in series, or stacked one on top of the other, to form what is referred to as a fuel cell stack. The fuel cell stack is loaded in compression to maintain low interfacial electrical contact resistance between fuel cell plates, the gas diffusion media, and the catalyst electrodes. The interfacial contact resistance in the fuel cell stack is directly related to the compression loading. Typically, compression loads on the fuel cell plates range from about 50 to about 400 psi, and are controlled by a compression retention system.

Compression retention systems are typically designed in a manner effective to offset strains produced by membrane swelling and compressive stress relaxation in the fuel cell stack. Such systems act to minimize an over-compression of the diffusion media in the fuel cell stack, as well as maintain the stack compression and contact pressure between bipolar plates, gas DM, and catalyst layers. It is disclosed in U.S. Pat. No. 5,484,666 that conventional compression retention systems have consisted of tie rods extending through and between end plate assemblies secured with fastening nuts. Springs threaded on the tie rods and interposed between the fastening nuts and the end plates have been used to apply resilient compressive force to fuel cell stacks in the stacking direction.

There is a continuing need for a compression retention system that allows for a minimization of spring rate in relation to conventional systems by taking advantage of the available area along the sides of the fuel cell stack. Desirably, the compression retention system also serves as an electromagnetic interference (EMI) and an environmental enclosure.

SUMMARY OF THE INVENTION

In concordance with the instant disclosure, a compression retention system that allows for a minimization of spring rate and that may also serve as an EMI and an environmental enclosure is surprisingly found.

In one embodiment, a compression retention system includes a first end unit and a second end unit configured to hold a fuel cell stack therebetween. A spring is configured to apply a compressive force to the fuel cell stack. The compression retention system includes a first spring plate and a second spring plate having the spring disposed therebetween. The first spring plate has an aperture formed therein. At least one sheet is coupled to the first spring plate and the first end unit. A spring strut is disposed through the aperture of the first spring plate and coupled to the second spring plate and to the second end unit.

In another embodiment, a fuel cell system includes the compression retention system having a fuel cell stack with a plurality of fuel cells disposed therebetween.

In a further embodiment, a method for manufacturing the fuel cell system includes the steps of: providing the fuel cell stack having the plurality of fuel cells; providing the compression retention system; disposing the fuel cell stack between the first end unit and the second end unit of the compression retention system; securing the spring strut of the compression retention system; applying a tensile force to the spring strut; coupling the spring strut to the second end unit; and removing the tensile force. A compressive force is thereby applied to the fuel cell stack by the urging of the first end unit toward the second end unit by the spring.

DRAWINGS

The above, as well as other advantages of the present disclosure, will become readily apparent to those skilled in the art from the following detailed description, particularly when considered in the light of the drawings described herein.

FIG. 4 is a fragmentary, front elevational view of a side spring of the compression retention system illustrated in FIGS. 2 and 3;

FIG. 5 is a fragmentary, front elevational view of the side spring of the compression retention system illustrated in FIGS. 2 and 3, showing first and second sheets secured to a spring housing;

FIG. 6 is a fragmentary, front elevational view of the side spring of the compression retention system illustrated in FIGS. 2 and 3, showing a folding of the first sheet around a first spring plate and secured to itself;

FIG. 7 is a fragmentary, front elevational view of the side spring of the compression retention system illustrated in FIGS. 2 and 3, showing a hanger feature added to the first spring plate and cooperating with a hole formed in one of the sheets;

FIG. 10 is a perspective view of a compression tooling for assembling the fuel cell system according to the present disclosure; and FIG. 11 is an exploded perspective view of the compression tooling illustrated in FIG. 10.

DETAILED DESCRIPTION OF THE INVENTION

Figure 1:
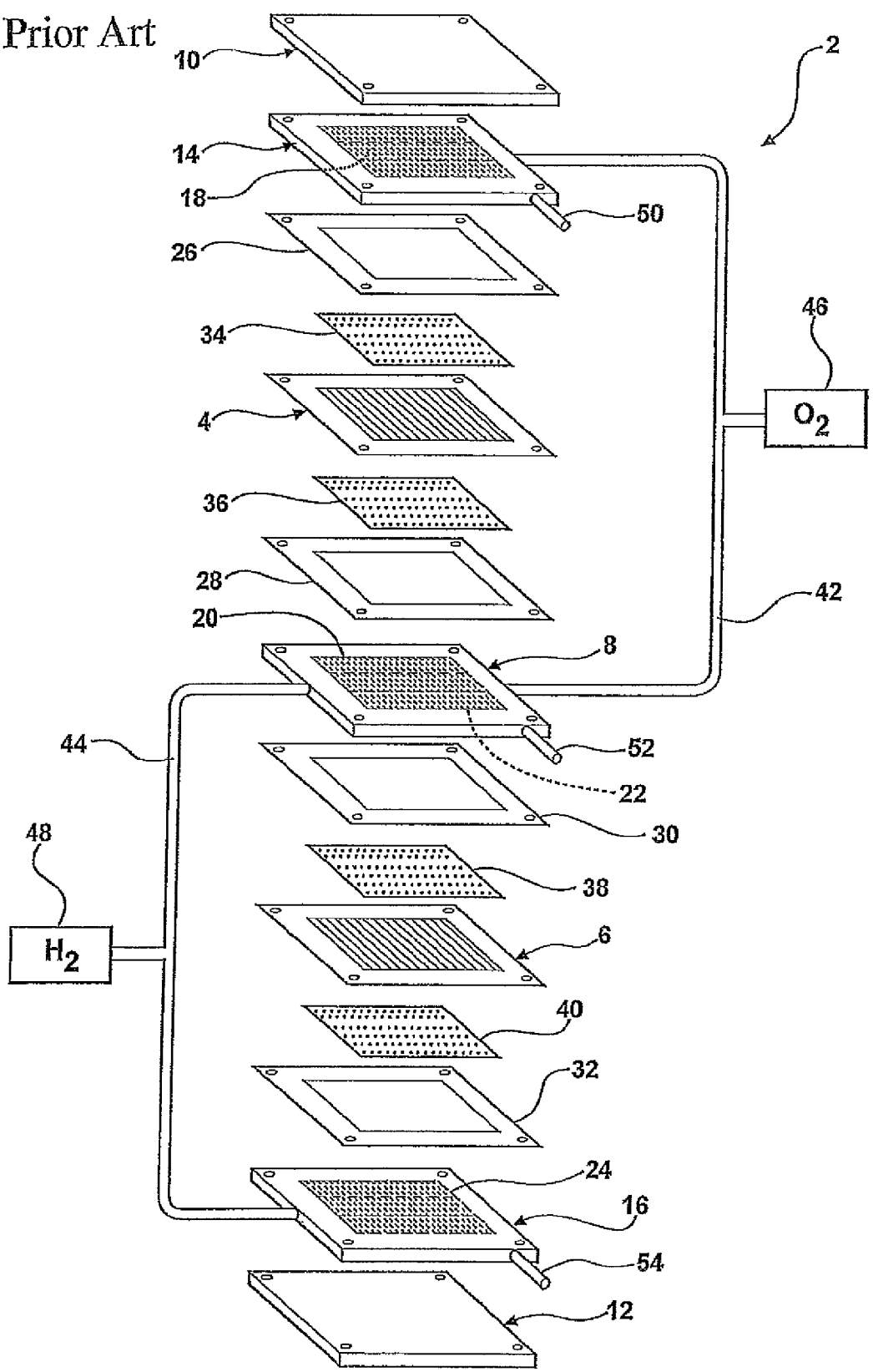
FIG. 1 illustrates a schematic, exploded perspective view of a PEM fuel cell stack (only two cells shown) known in the art.

The following description is merely exemplary in nature and is not intended to limit the present disclosure, application, or uses. It should be understood that throughout the drawings, corresponding reference numerals also indicate like or corresponding parts and features. In respect of the methods disclosed, the steps presented are exemplary in nature, and thus, are not necessary or critical.

FIG. 1 depicts a PEM fuel cell stack 2 having a pair of membrane electrode assemblies (MEAs) 4, 6 separated from each other by an electrically conductive bipolar plate 8. The illustrative fuel cell stack 2 depicted in FIG. 1 has two cells, although it should be appreciated that a fuel cell stack 2 in practice may include many more fuel cells. A skilled artisan should further appreciate that other fuel cell designs and types, such as metal hydride fuel cells, phosphoric acid fuel cells, solid oxide fuel cells, electrogalvanic fuel cells, and alkaline fuel cells, may be employed according to the present disclosure.

The MEAs 4, 6 and bipolar plate 8, are stacked together between end plates 10, 12, and end contact elements 14, 16. The end contact element 14, both working faces of the bipolar plate 8, and the end contact element 16 contain a plurality of flowpath grooves or channels 18, 20, 22, 24, respectively, for distributing fuel and oxidant gases such as $H_2$ and $O_2$, for example, to the MEAs 4, 6. Nonconductive gaskets 26, 28, 30, 32 provide seals and electrical insulation between components of the fuel cell stack 2.

Diffusion media (DM) 34, 36, 38, 40 are typically formed by a gas permeable conductive material such as a carbon/graphite diffusion paper, for example. The DM 34, 36, 38, 40 are caused to press against the electrode faces of the MEAs 4, 6. The end contact elements 14, 16 are caused to press against the DM 34, 40 respectively, while the bipolar plate 8 is caused to press against the DM 36 on an anode face of MEA 4, configured to accept an hydrogen-bearing reactant, and against DM 38 on a cathode face of MEA 6, configured to accept an oxygen-bearing reactant. The oxygen-bearing reactant is supplied to a cathode side of the fuel cell stack 2 from a storage tank 46 by an appropriate supply conduit 42. The hydrogen-bearing reactant is supplied to an anode side of the fuel cell stack 2 from storage tank 48, by an appropriate supply conduit 44. Alternatively, ambient air may be supplied to the cathode side as an oxygen-bearing reactant and hydrogen to the anode side from a methanol reformer, a gasoline reformer, or the like.

Exhaust conduits (not shown) for both the anode and the cathode sides of the MEAs 4, 6 are also provided. Additional conduits 50, 52, 54 are provided for supplying a coolant to the bipolar plate 8 and the end plates 14, 16. Appropriate conduits (not shown) for exhausting coolant from the bipolar plate 8 and the end plates 14, 16 are also provided.

Figure 2:
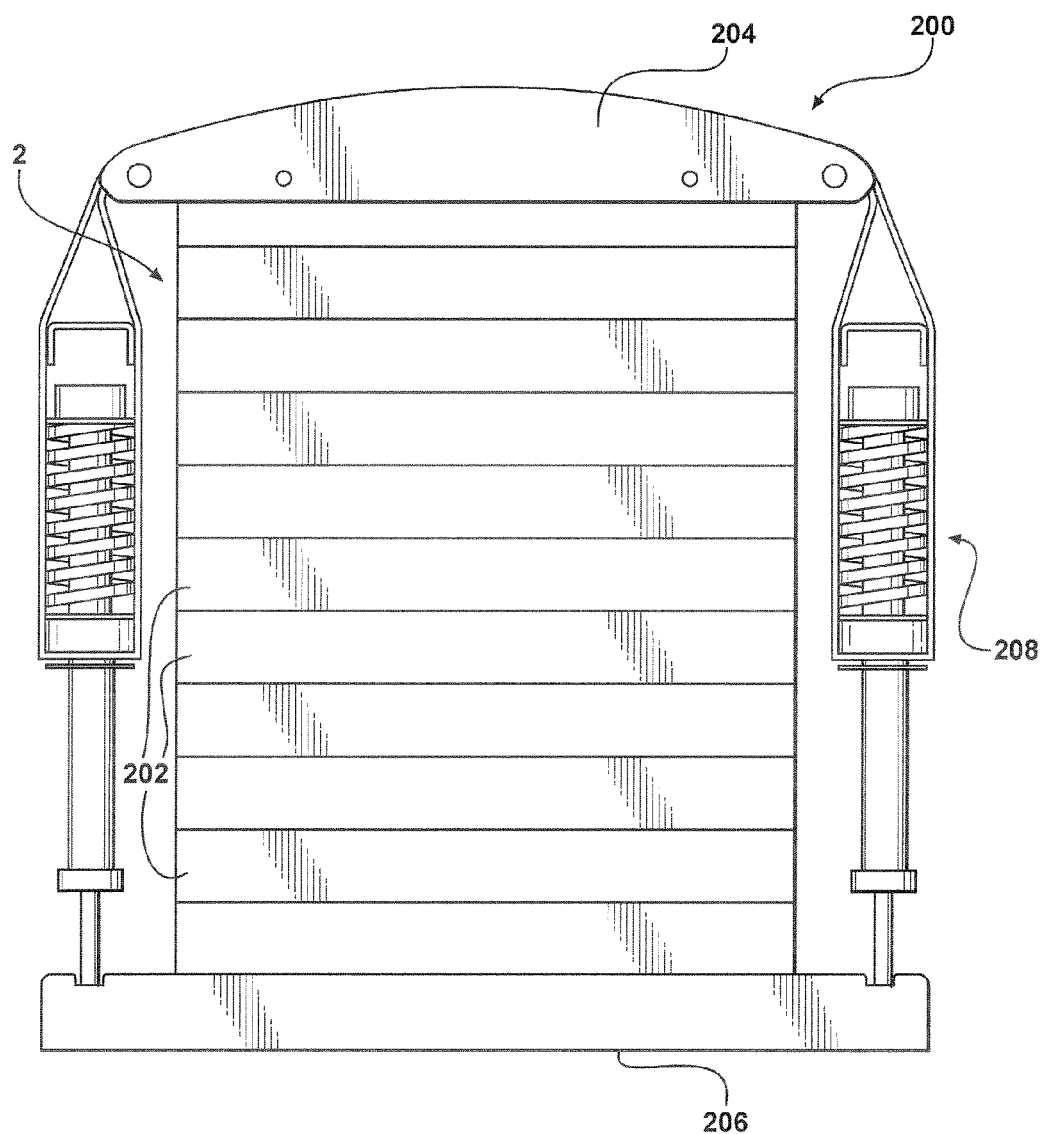
FIG. 2 is a front elevational view of a fuel cell system having the fuel cell stack depicted in FIG. 1, the fuel cell stack assembled with a compression retention system according to the present disclosure.
Figure 3:
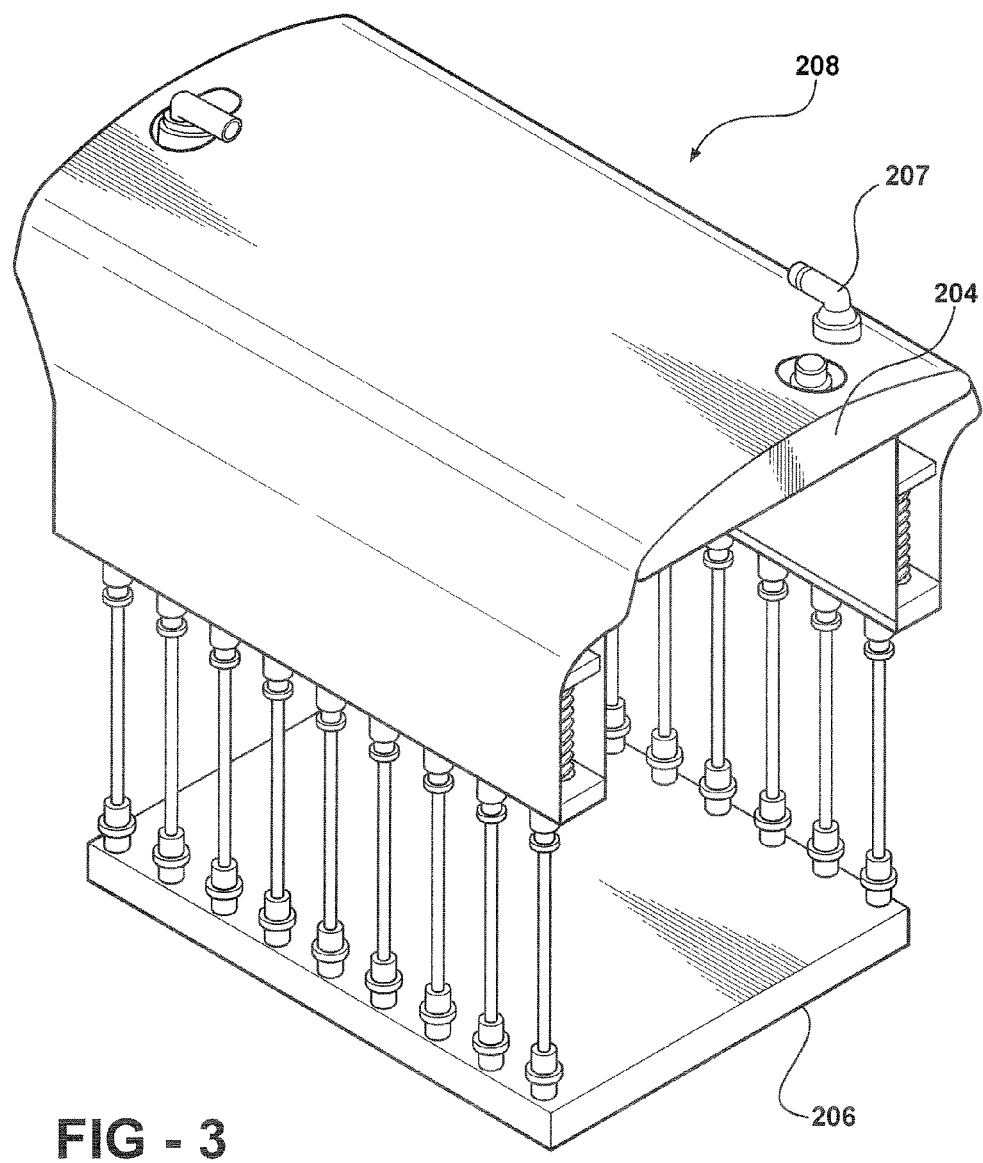
FIG. 3 is a perspective view of the compression retention system depicted in FIG. 2, shown without the fuel cell stack.

Referring next to FIGS. 2 and 3, a fuel cell system 200 according to the present disclosure is shown. The fuel cell system 200 has the fuel cell stack 2 including a plurality of individual fuel cells 202 disposed between a first end unit 204 and a second end unit 206. A compressive force is applied to the fuel cell stack 202 by a compression retention system 208.

In particular embodiments, at least one of the first and second end units 204, 206 is an end plate. In a particularly illustrative embodiment, the first and second end units 204, 206 house at least one fuel cell subsystem 207 or related device involved in preconditioning and operation of the fuel cell stack 2. As nonlimiting examples, the fuel cell subsystems 207 and related devices housed within the first and second end units 204, 206 can include fluid passages, such as hydrogen fuel and oxidant ($O_2$/air) passages, coolant pumps, recirculation pumps, drainage valves, insulation, fans, compressors, valves, electrical connections, reformers, humidifiers, water vapor transfer units, heat exchangers, and like or related instrumentation. The integration of the fuel cell subsystem 207 and related devices into the end units 204, 206 contributes to faster cold starts as the systems are heated more quickly due to the proximity to the fuel cell stack 2. Furthermore, integration results in faster re-starts as there is little to no plumbing external to the fuel cell system 200, and an opportunity for heat energy loss is minimized. The integration of the fuel cell subsystem 207 and related devices into the end units 204, 206 also eliminates the need for an external housing and conduits, thereby minimizing the overall thermal mass of the fuel cell system 200.

The first and second end units 204, 206 may be suitably formed from metal, metal alloys, plastic or plastic composite materials. The plastic or plastic composite material may further include one or more reinforcing fillers. Suitable plastic or plastic composite materials do not swell significantly when exposed to water, nor degrade significantly with exposure to temperatures associated with typical operation of fuel cell stacks. It should also be appreciated that suitable plastic materials do not contain materials that leach or migrate significantly from the material and into the fuel cell stack 2. It should further be appreciated that the end units 204, 206 may insulate the fuel cell stack 2 and integrated subsystems.

Referring now to FIG. 4, the compression retention system 208 according to the present disclosure includes a first sheet 210 and a second sheet 212. The first end unit 204 abuts the sheets 210, 212. The compression retention system 208 further includes a first spring plate 214 and a second spring plate 216. A spring 218 is disposed between the first spring plate 214 and the second spring plate 216. The first spring plate 214 is coupled to the pair of sheets 210, 212 and has an aperture 220 formed therein. The second spring plate 216 is coupled to a spring strut 222. The spring strut 222 is disposed through the aperture 220 in the first spring plate 214 and further coupled to the second end unit 206, as shown in FIG. 3.

It should be understood that the spring 218 provides the compressive force to the fuel cell stack 2. In particular embodiments, the spring 218 is placed in compression upon assembly of the fuel cell system 2. The spring 218 urges the first spring plate 214 away from the second spring plate 216, and thereby the first end unit 204 toward the second end unit 206, during operation of the compression retention system 208. The spring 218 can include, as illustrative examples, one or more disc springs and/or coiled springs. Additional suitable types of spring 218 can include planar springs, leaf springs, corrugated springs, and gas springs, for example. The spring 218 under compression thereby provides the compressive force to the fuel cell stack 2.

The first and second sheets 210, 212 of the disclosure are formed from a material sufficient to provide the compressive force to the fuel cell stack 2. Suitable materials may include metal, metal alloys, plastic, and plastic composite materials. In one embodiment, the first and second sheets 210, 212 include a thin layer of metal. In a nonlimiting example, the thin layer of metal is a sheet metal. Illustrative examples of suitable sheet metals include aluminum, brass, copper, steel, tin, nickel, titanium, and alloys thereof. It should be recognized that sheet metal is available in a variety of gauges which are suitable for the first and second metal sheets 210, 212 of the present disclosure. As nonlimiting examples, suitable sheet metal gauges can range from about 0.016 inches (about 0.4 mm) to about 0.16 inches (about 4 mm). In particular embodiments, the thickness of the first and second sheets 210, 212 is about 0.05 inches (about 1.2 mm). It is understood, however, that sheet metal of other thickness can be used as desired. The sheet metal is typically sized according to the desired tensile loads to be applied to the sheets 210, 212.

The sheets 210, 212 may be coupled to the first end unit 204 and the first spring plate 214 by any conventional fastening device. As nonlimiting examples, the fastening device is at least one of a bolt, a weld, a rivet, a snap, and a clamp. In a particular embodiment, the sheets 210, 212 are disposed over and cover the first end unit 204 after formation of the end unit 204 via molding, for example. The sheets 210, 212 may be frictionally coupled to the first end unit 204. It should be appreciated that the sheets 210, 212 when covering the first end unit 204 may provide for an optimized distribution of compression forces on the first end unit 204. Other suitable means for coupling the sheets 210, 212 to the first end unit 204 and the first spring plate 214 may be employed as desired.

The second spring plate 216 may also be coupled to the second end unit 206 by any conventional fastening device. In a particular embodiment, the second spring plate 216 is secured to the second end unit 206 with a bolt 224. As a nonlimiting example, the spring strut 222 may have a first end 225 with a threaded exterior and a second end 227 with a threaded interior. The first end 225 with the threaded exterior may be securely threaded with the second spring plate 216. The threaded exterior of the first end 225 may facilitate an adjustment of the compression force applied to the fuel cell stack 2. The second end 227 with the threaded interior may be securely threaded with the bolt 224 disposed through the second end unit 206 to couple the spring strut 222 to the second end unit 206. The second spring plate 216 may thereby be coupled to the second end unit 206.

In a further embodiment, the compression retention system 208 may include a sheet separator 228. The sheet separator 228 is disposed between the sheets 210, 212 adjacent the second spring plate 216. The sheet separator 228 is adapted to space apart the sheets 210, 212 at a width sufficient for the spring 218 to be disposed therebetween. As shown in FIG. 4, the sheet separator 228 may be a C-channel member. As further illustrated in FIG. 6, the sheet separator 229 may be a cylindrical member, such as a pipe. Other suitable shapes for spacing apart the pair of sheets 210, 212 may be employed as desired.

As shown in FIG. 5, the spring 218 may be disposed in a housing 230. The housing 230 may substantially enclose the spring 218 and at least one of the first and second spring plates 214, 216. It should be understood that the housing 230 may also function as the sheet separator 228. The housing 230 may have a substantially rectangular cross-sectional shape, such as if the housing 230 is a tube or pipe. Other suitable housing 230 shapes may also be used. In one embodiment, the housing 230 may be coupled to the first spring plate 214 and to the sheets 210, 212. Each of the sheets 210, 212 may be disposed on opposing sides of the housing 230 and coupled thereto, for example, by any conventional fastener.

With renewed reference to FIG. 6, the sheets 210, 212 may be coupled to the first end unit 204 as desired. The pair of sheets 210, 212 may be formed from a folded continuous sheet, for example. In the embodiment of FIG. 6, the first sheet 210 may form a fold 232 around the first spring plate 214. A portion of the first sheet 210 on the inside of the compression retention system 208 may be coupled directly to the first end unit 204. A portion of the first sheet 210 that forms the fold 232 around the first spring plate 214 may then be secured to the portion coupled to the first end unit 204. The sheet 210 may thereby function as the pair of sheets 210, 212 and be abut both the first end unit 204 and the first spring plate 214.

As further shown in FIG. 7, the first spring plate 214 may include at least one hanger feature 234, such as a tab, for example. At least one of the sheets 210, 212 has a hole 236 formed therein adapted to cooperate with the hanger feature 234. The first spring plate 214 may further have a groove 238 formed therein that at least one of the first and second sheets 210, 212 may be inserted into to secure the sheets 210, 212 to the first spring plate 214.

Figure 8:
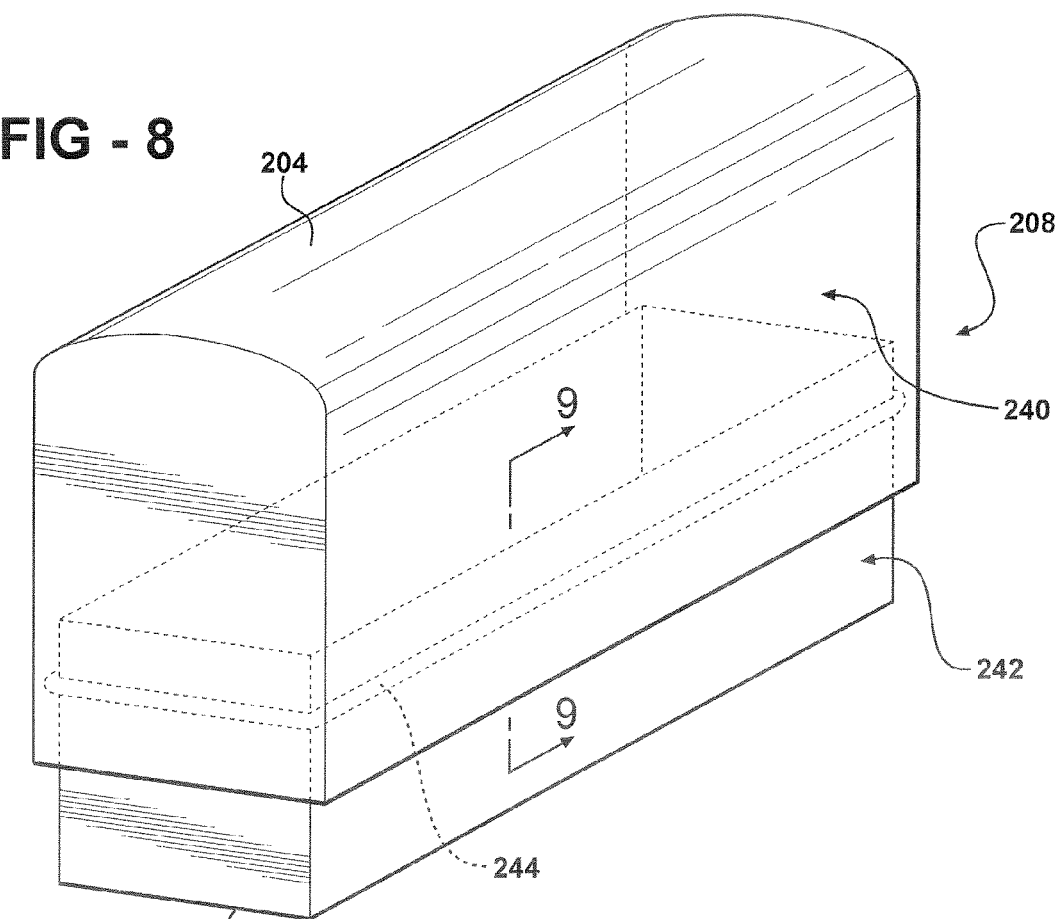
FIG. 8 is a schematic, perspective view of the compression retention system according to the present disclosure, showing a first enclosure cooperating with a second enclosure.
Figure 9:
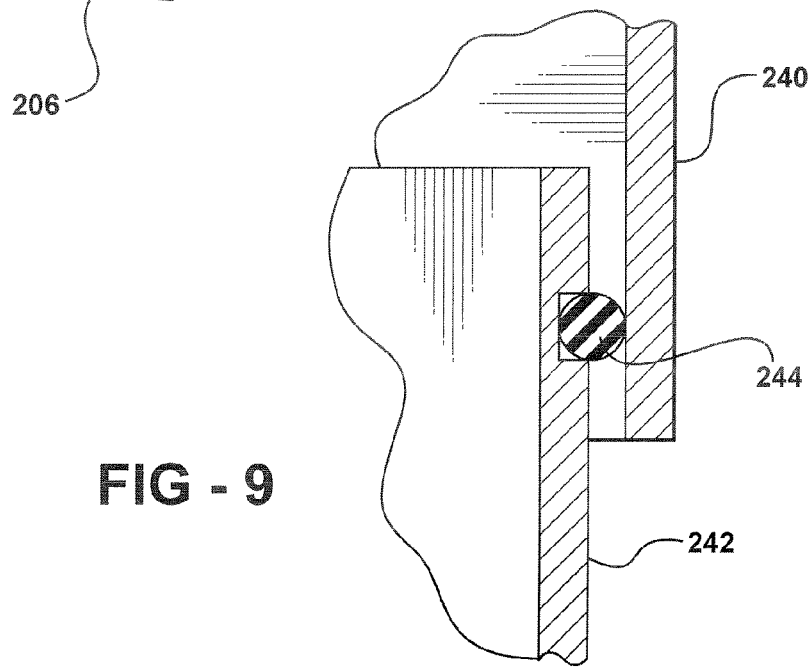
FIG. 9 is an enlarged, fragmentary schematic view of the compression retention system illustrated in FIG. 8, showing a seal between the first enclosure and the second enclosure.

The compression retention system 208 of the present disclosure may also serve as a combined EMI shield and environmental shield for the fuel cell stack 2. As shown in FIGS. 8 and 9, at least one of the sheets 210, 212 may extend beyond the first spring plate 214 to form an upper first enclosure 240. The first enclosure 240 may further have panels disposed adjacent the front and the back of the fuel cell stack 2 to substantially enclose an upper portion of the fuel cell stack 2. The first enclosure 240 is adapted to overlap and cooperate with a similar lower second enclosure 242 coupled to the second end unit 206. Referring to FIG. 9, the first and second enclosures 240, 242 may have a seal 244 disposed therebetween. The seal 244 is generally polymeric and facilitates a substantially fluid tight seal between the first and second enclosures 240, 242. In a particular embodiment, the seal 244 is a combination EMI and environmental wiper seal, such as an axial polymeric seal that creates a substantially fluid tight seal while allowing a relative movement of the first and second enclosures 240, 242. The wiper seal may be used for fluid containment and to prevent dirt from entering the fuel cell stack 2. A skilled artisan may select other suitable seals as desired.

The present disclosure further includes a method for manufacturing the fuel cell system 200. The method first includes the steps of providing the fuel cell stack 2 having the plurality of fuel cells, and providing the compression retention system 208 as described hereinabove. The fuel cell stack 2 is then disposed between the first end unit 204 and the second end unit 206. The spring strut 222 of the compression retention system 208 is secured. For example, the spring strut 222 may have a flared portion adapted to be securely gripped, for example, by a compression tooling (shown in FIGS. 10 and 11).

The method further includes the step of applying a tensile force to the spring strut 222, thereby imparting a compressive load on the fuel cell stack 2. The spring strut 222 is then coupled to the second end unit 206 and the tensile force removed. It should be appreciated that after the tensile force is applied, the spring strut 222 is secured, and the tensile force removed, the spring 218 is compressed. The spring 218 urges the first and second spring plates 214, 216 away from one another upon the completion of the assembly of the fuel cell system 200.

Referring now to FIGS. 10 and 11, the method of the present disclosure may be practiced with a compression tooling 300. The compression tooling 300 includes a pressure plate 302, a pair of side plates 306, and at least a pair of spring strut grip rails 308. The pressure plate 302 is disposed between the side plates 306. Each spring strut grip rail 308 is secured to one of the side plates 306. The pressure plate 302 is configured to cause the side plates 306 and the spring strut grip rails 308 to apply the compressive load for the fuel cell stack 2 upon insertion of the fuel cell stack 2 and the compression retention system 208 into the compression tooling 300. By applying a compressive force to the pressure plate 302, the spring strut grip rails 308 provide a tensile load to the spring struts 222. The spring strut grip rails 308 may contact the spring strut 222 of the fuel cell system 200 to apply the compressive load to the fuel cell stack 2. When the compressive force is subsequently released from the pressure plate 302, it should be understood that the securing of the spring strut 222 to the second end unit 206 results in retaining the compression of the spring 218 and the fuel cell stack 2.

It should be appreciated that the compression retention system 208 of the present disclosure optimizes a height of the fuel cell system 2 by having the springs 218 disposed at the sides of the fuel cell system 2 instead of at the top, as is the case with certain known compression retention systems. The compression retention system 208 further has an optimized spring rate through the ability to use springs 218 having lower compression on the sides of the fuel cell stack 2. The optimized spring rate provides improved durability over compression retention systems 208 of the art.

While certain representative embodiments and details have been shown for purposes of illustrating the invention, it will be apparent to those skilled in the art that various changes may be made without departing from the scope of the disclosure, which is further described in the following appended claims.

What is claimed is:

1. A compression retention system, comprising:
    a first end unit and a second end unit configured to hold a fuel cell stack therebetween;
    a spring configured to apply a compressive force to the fuel cell stack;
    a first spring plate and a second spring plate having the spring disposed therebetween;
    at least one sheet coupled to the first spring plate and the first end unit; and
    a spring strut coupled to the second spring plate and to the second end unit.

2. The compression retention system of claim 1, further comprising a sheet separator disposed between the pair of sheets adjacent the second spring plate.

3. The compression retention system of claim 1, wherein the spring is a compression spring.

4. The compression retention system of claim 1, where the first spring plate has an aperture formed therein, the spring strut disposed through the aperture.

5. The compression retention system of claim 1, wherein the spring strut has a first end with a threaded exterior and a second end with a threaded interior.

6. The compression retention system of claim 5, wherein the second end of the spring strut is securely threaded with a bolt disposed through the second end unit.

7. The compression retention system of claim 6, wherein the spring strut is disposed through the spring and securely threaded at the first end with the second spring plate to couple the second spring plate to the second end unit.

8. The compression retention system of claim 1, further comprising a spring housing enclosing the first spring plate, the second spring plate, and the spring.

9. The compression retention system of claim 8, wherein the spring housing is coupled to the first spring plate and to the sheets.

10. The compression retention system of claim 1, wherein the sheet includes a first sheet, the first sheet wrapped around the first end unit and coupled to itself.

11. The compression retention system of claim 1, wherein the first spring plate has a hanger feature formed thereon and the at least one sheet has a hole formed therein, the hanger feature cooperating with the hole to couple the first spring plate to the sheet.

12. The compression retention system of claim 1, wherein the pair of sheets includes a first sheet and a second sheet, the second sheet extending beyond the first spring plate adjacent the spring strut to form a first enclosure.

13. The compression retention system of claim 12, wherein the second end unit has a second enclosure attached thereto, the second enclosure cooperating with the first enclosure to substantially seal the fuel cell stack.

14. The compression retention system of claim 13, further including a seal member disposed between the first enclosure and the second enclosure.

15. The compression retention system of claim 14, wherein the seal is a combination electromagnetic interference and environmental wiper seal.

16. A fuel cell system, comprising:
    a fuel cell stack having a plurality of fuel cells; and
    a compression retention system, including
        a first end unit and a second end unit having the fuel cell stack disposed therebetween,
        a spring configured to apply a compressive force to the fuel cell stack,
        a first spring plate and a second spring plate having the spring disposed therebetween,
        at least one sheet coupled to the first spring plate and the first end unit, and
        a spring strut coupled to the second spring plate and to the second end unit.

17. The fuel cell system of claim 16, wherein at least one of the first end unit and the second end unit include at least one fuel cell subsystem.

* * * * *